United States Patent Office 2,806,836
Patented Sept. 17, 1957

2,806,836

DIISOCYANATE MODIFIED POLYESTER COPOLYMER AND PROCESS OF MAKING SAME

Günther Nischk, Leverkusen-Wiesdorf, and Karl E. Müller, Leverkusen-Bayerwerk, Germany, assignors to Farbenfabriken Bayer Aktiengesellschaft, Leverkusen, Germany, a corporation of Germany No Drawing. Application October 6, 1953,
Serial No. 384,516

Claims priority, application Germany October 14, 1952

5 Claims. (Cl. 260—45.4)

This invention relates to a new process of producing copolymers.

It is known to copolymerize unsaturated polyesters with vinyl compounds or polyallyl compounds. The production of these unsaturated polyesters is carried out by thermal esterification of glycols with dicarboxylic acids. Of the unsaturated dicarboxylic acids, maleic acid is of special importance. The unsaturated polyesters thus obtained contain, for the most part, besides maleic acid, varying quantities of dicarboxylic acids devoid of aliphatic unsaturation such as adipic acid or phthalic acids. It has also been proposed to carry out the copolymerization of said unsaturated polyesters and vinyl compounds in the presence of saturated polyesters which simultaneously serve as a plasticizer for the copolymer.

The above polymerization is generally carried out in the presence of peroxides, for instance benzoylperoxide, at elevated temperature, but according to another proposal the polymerization is carried out at room temperature by incorporating minor quantities of compounds containing a tertiary nitrogen atom with the unsaturated or saturated polyesters by condensation.

According to the present invention, saturated, substantially linear non-polymerizable polyesters of a molecular weight of at least 500, preferably from 500–10,000, are linked by means of isocyanate groups with unsaturated compounds which are capable of yielding copolymers with vinyl compounds (containing the group =C=C= in an aliphatic linkage), and the resultant unsaturated addition products are copolymerized with said vinyl compounds. The said unsaturated addition products are produced by reacting the linear saturated polyesters with unsaturated organic isocyanates containing the group =C=C= in an aliphatic linkage and having the isocyanate group at least twice in the molecule. These diisocyanates containing such vinyl groups are obtaintable for instance by reacting 2 mols of toluylenediisocyanate with 1 mole of butenediol, or by reacting with the above-said bis-glycol maleates. These addition products are then copolymerized with vinyl compounds (containing the group =C=C= in an aliphatic linkage); unsaturated compounds, such as styrene, vinyl acetate, diallylester, glycol diacrylate and methylvinylketone are also suitable for this purpose.

As starting materials there are employed saturated linear polyesters obtained by esterifying glycols with dicarboxylic acids by conventional methods. These saturated linear polyesters may further have incorporated in them components containing a tertiary nitrogen atom. The end groups of the polyesters should preferably consist of hydroxyl groups and the molecular weight should be in the range of between 500 and 10,000.

The addition products obtained by the above process are copolymerized with vinyl compounds. Depending upon the composition of the polyester and the proportion of the vinyl components elastic rubber-like, leather-like or rigid vitreous transparent compounds with excellent properties are obtained. For instance the reaction of glycol adipic acid polyester with toluylene diisocyanate and maleic acid-bis-(diethyleneglycolester) followed by copolymerization with styrene gives highly elastic products with good mechanical properties. By replacing the adipic acid step-by-step by phthalic acid until finally pure glycol phthalic acid polyesters are employed, first leather-like and finally rigid products are obtained.

The new process is distinguished from the previously known, above mentioned methods in that it allows of producing leather-like and elastic rubber-like products with good mechanical properties and rigid materials of substantially improved mechanical properties. The cause of these advantages is the regular construction of the linear unsaturated polyesters, in which, as already mentioned above, the double bonds are distributed over the chain at equal intervals.

Consequently, a regular network (cellular structure) is also obtained on co-polymerization with vinyl compounds. The regular construction is of special importance for the properties and quality of the end products.

The invention is further illustrated by the following examples, the parts being by weight.

*Example 1*

500 parts of the saturated polyester prepared in conventional manner from 1 mol of adipic acid and 1 mol of glycol and having the hydroxyl number 61 and the acid number 1.8, are dehydrated in vacuo at 130° C. for 1 hour. 170 parts of the addition product prepared from 2 mols of toluylene-diisocyanate and 1 mol of maleic acid-bis-(disglycolester) are added and the mixture is stirred at 120° C. for 20 minutes. After addition of 0.8 part of hydroquinone and 285 parts of styrene the mixture is stirred for some time and then forced out of the reaction vessel.

The product is mixed with 1% of benzoylperoxide and polymerized at 100° C. A rubber-elastic product is obtained.

*Example 2*

500 parts of an adipic acid phthalic acid glycolpolyester of the hydroxyl number 56 and the acid number 1, which is prepared by esterification of 1 mol of phthalic anhydride, 2 mols of adipic acid and 3 mols of glycol, are dehydrated in vacuum at 130° C. 100 parts of the addition product of 2 mols of toluylene diisocyanate and 1 mol of maleic acid-bis-diethylene glycol ester are added. After stirring at 130° C. for 30 minutes 0.45 part of hydroquinone and 275 parts of styrene are added. The mixture is stirred until homogeneous and 18 parts of benzoylperoxide are added with stirring and the mixture is cast into molds. The polymerization is carried out at 100° C. for 12 hours. A leather-like polymer is obtained.

*Example 3*

500 parts of a phthalic acid glycol polyester of the hydroxyl number 100 and the acid number 0.5 are dehydrated in vacuum at 130° C. 230 parts of an addition product of 2 mols of hexamethylene diisocyanate and 1 mol of maleic acid-bis-di-ethylene glycol ester are added at 125° C. and the mixture is kept at this temperature for 30 minutes. 0.5 part of hydroquinone and 315 parts of styrene are added with stirring at 110° C. and polymerization is carried out at 100° C. for 12 hours with the addition of 25 parts of benzoylperoxide. The copolymer obtained is clear as glass and completely rigid at room temperature. It is elastic at higher temperatures.

It is possible, of course, to combine the unsaturated polyesters obtainable by previously known processes with the products obtained by the herein described process.

This allows of modifying the properties of the end products in any desired direction.

We claim:

1. Process for the production of polyester copolymers, which comprises reacting a non-polymerizable linear polyester, said polyester being a condensation product of a saturated dihydric alcohol and a dicarboxylic acid reactant devoid of aliphatic unsaturation, of a molecular weight of at least 500 and having free hydroxyl groups with an unsaturated organic isocyanate containing the group =C=C= in an aliphatic linkage and having the isocyanate group at least twice in the molecule, and reacting the resulting addition product with a vinylidene compound in the presence of a peroxide.

2. Process in accordance with claim 1, in which said unsaturated organic isocyanate is a diurethane obtained by reacting 2 mols of an organic diisocyanate with an unsaturated ester obtained from maleic acid and glycol and having two terminal hydroxyl groups.

3. Process in accordance with claim 2, in which said unsaturated organic isocyanate is a diurethane obtained by reacting one mol of butenediol with two mols of a diisocyanate.

4. Process in accordance with claim 1, in which said vinyl compound is styrene.

5. Products obtained by the process of claim 1.

References Cited in the file of this patent

UNITED STATES PATENTS 2,503,209  Nyquist et al. _____ Apr. 4, 1950